（12） United States Patent
Grandesso

(10) Patent No.: US 10,697,581 B2
(45) Date of Patent: Jun. 30, 2020

(54) ORIENTABLE MODULE FOR VIDEO/PHOTOGRAPHIC EQUIPMENT

(71) Applicant: VITEC IMAGING SOLUTIONS S.p.A., Cassola (PD) (IT)

(72) Inventor: Stefano Grandesso, Bassano del Grappa (IT)

(73) Assignee: VITEC IMAGING SOLUTIONS S.P.A., Cassola (PD) (IT)

(*) Notice: Subject to any disclaimer, the term of this patent is extended or adjusted under 35 U.S.C. 154(b) by 0 days.

(21) Appl. No.: 16/092,933

(22) PCT Filed: Apr. 12, 2017

(86) PCT No.: PCT/IB2017/052109
§ 371 (c)(1),
(2) Date: Oct. 11, 2018

(87) PCT Pub. No.: WO2017/178982
PCT Pub. Date: Oct. 19, 2017

(65) Prior Publication Data
US 2019/0145573 A1 May 16, 2019

(30) Foreign Application Priority Data
Apr. 13, 2016 (IT) .......................... 102016000038153

(51) Int. Cl.
*F16M 11/14* (2006.01)
*F16C 11/06* (2006.01)
(Continued)

(52) U.S. Cl.
CPC ............. *F16M 11/14* (2013.01); *F16C 11/06* (2013.01); *F16C 11/106* (2013.01);
(Continued)

(58) Field of Classification Search
CPC ............. F16M 11/14; F16M 2200/022; F16M 11/2078; F16M 13/022; F16C 11/106; F16C 11/06; F16C 11/0661; G03B 17/561
(Continued)

(56) References Cited

U.S. PATENT DOCUMENTS 729,520 A * 5/1903 Robbins ................. F16M 11/14
248/181.1
1,797,893 A * 3/1931 Zerk ...................... F16M 11/14
248/181.1
(Continued)

FOREIGN PATENT DOCUMENTS

DE 837610 C 4/1952
DE 202005009400 U1 9/2005
(Continued)

*Primary Examiner* — Hiwot E Tefera
*Assistant Examiner* — Taylor L Morris
(74) *Attorney, Agent, or Firm* — Volpe and Koenig, P.C.

(57) ABSTRACT

An orientable support module (1) for optical or video/photographic equipment, comprising a first (2) and a second (3) joint element connected together so as to be able to oscillate and intended to be coupled respectively to a support element (5, 100) and to a piece of optical or video/photographic equipment so as to orient the equipment, the second joint element (3) comprising a head (6) and a shaft (7) extending from the head (6) along its own longitudinal axis (Z), the first joint element (2) comprising a body (12) defining a seating cavity (13) for the head (6), the module further comprising a locking device (20) that can be actuated so as to displace the second joint element (3) along a locking axis (Z) between a release configuration, in which the second joint element (3) is free to oscillate in the seating cavity (13), and a locked configuration (W), in which the second joint element (3) is clamped in the seating cavity (13) and is locked in a desired orientation position, the locking device (20) comprising a bush (21) engaged on the shaft (7)

(Continued)

and displaceable along the longitudinal axis (Z) so as to clamp/release the second joint element (3) in/from the seating cavity (13).

9 Claims, 4 Drawing Sheets

(51) Int. Cl.
  *F16C 11/10* (2006.01)
  *F16M 13/02* (2006.01)
  *F16M 11/20* (2006.01)
(52) U.S. Cl.
  CPC ....... *F16M 13/022* (2013.01); *F16M 11/2078* (2013.01); *F16M 2200/022* (2013.01)
(58) Field of Classification Search
  USPC .................................................. 248/181.1
  See application file for complete search history.

(56) References Cited

U.S. PATENT DOCUMENTS

| | | | | | |
|---|---|---|---|---|---|
| 1,894,457 | A * | 1/1933 | Zerk | ........... | F16M 11/14 248/181.1 |
| 2,180,214 | A * | 11/1939 | Rapp | ........... | F16M 11/14 248/181.1 |
| 2,464,500 | A * | 3/1949 | Graham | ........... | F16M 11/10 248/181.1 |
| 2,670,228 | A * | 2/1954 | Pagliuso | ........... | F16M 11/14 248/177.1 |
| 2,859,983 | A * | 11/1958 | May | ........... | F21V 19/02 248/288.31 |
| 2,910,310 | A * | 10/1959 | Mulac | ........... | F16C 11/0604 285/148.19 |
| 3,149,863 | A * | 9/1964 | Melton | ........... | F16C 11/06 277/507 |
| 3,186,736 | A * | 6/1965 | Warshawsky | ........... | F16C 11/08 174/86 |
| 3,306,640 | A * | 2/1967 | Melton | ........... | F16C 11/06 403/146 |
| 4,585,197 | A * | 4/1986 | Liautaud | ........... | F16M 11/14 248/309.4 |
| 4,974,802 | A * | 12/1990 | Hendren | ........... | F16C 11/106 248/181.1 |
| 5,544,968 | A * | 8/1996 | Goellner | ........... | B23Q 1/5462 248/181.1 |
| 6,017,010 | A * | 1/2000 | Cui | ........... | F16C 11/106 248/181.1 |
| 6,254,044 | B1 * | 7/2001 | Lee | ........... | F16M 11/14 248/163.1 |
| 6,352,228 | B1 * | 3/2002 | Buerklin | ........... | F16C 11/106 248/181.1 |
| 6,361,238 | B1 * | 3/2002 | Schittl | ........... | F16C 11/106 248/288.31 |
| 6,487,807 | B1 * | 12/2002 | Kopman | ........... | F41A 23/12 42/72 |
| 6,682,029 | B1 * | 1/2004 | Dierkes | ........... | F16M 11/14 248/158 |
| 7,229,053 | B2 * | 6/2007 | Speggiorin | ........... | F16M 11/14 248/163.1 |
| 7,241,069 | B2 * | 7/2007 | Richter | ........... | F16C 11/0661 248/288.31 |
| 7,281,693 | B2 * | 10/2007 | Chou | ........... | F16M 11/14 248/179.1 |
| 7,347,402 | B2 * | 3/2008 | White | ........... | F16M 11/14 124/86 |
| 7,454,839 | B2 * | 11/2008 | Della Bona | ........... | F16M 11/14 33/281 |
| 7,464,906 | B2 * | 12/2008 | Temperato | ........... | F16C 11/106 248/181.1 |
| 8,061,920 | B2 * | 11/2011 | Wimberley | ........... | F16M 11/14 248/181.1 |
| 8,087,626 | B1 * | 1/2012 | Weeden | ........... | F16M 11/14 248/218.4 |
| 8,267,361 | B1 * | 9/2012 | Dordick | ........... | F16M 11/14 248/178.1 |
| 8,550,442 | B2 * | 10/2013 | Philippe | ........... | B23Q 1/0063 269/271 |
| 8,572,849 | B1 * | 11/2013 | Clark | ........... | F16M 11/14 29/281.5 |
| 8,910,914 | B2 * | 12/2014 | Bigeh | ........... | F16M 11/14 248/188.1 |
| 8,944,392 | B2 * | 2/2015 | Yang | ........... | F16M 11/041 248/205.5 |
| 10,247,351 | B2 * | 4/2019 | Zarpellon | ........... | F16M 11/041 |
| 2004/0245416 | A1 * | 12/2004 | Attee | ........... | B25B 5/147 248/214 |
| 2007/0152115 | A1 | 5/2007 | Chou | | |
| 2008/0210832 | A1 * | 9/2008 | Speggiorin | ........... | F16M 11/14 248/183.1 |
| 2011/0150564 | A1 | 6/2011 | Stefan et al. | | |
| 2013/0105644 | A1 * | 5/2013 | Yu | ........... | G10G 5/005 248/125.7 |
| 2015/0184797 | A1 * | 7/2015 | Ma | ........... | F16M 13/02 403/122 |
| 2015/0337890 | A1 * | 11/2015 | Faccioli | ........... | F16C 11/0604 403/122 |

FOREIGN PATENT DOCUMENTS

| | | |
|---|---|---|
| DE | 202006000945 U1 | 4/2006 |
| DE | 102006018239 A1 | 10/2007 |
| EP | 0864801 A1 | 9/1998 |
| EP | 1939043 A1 | 7/2008 |
| EP | 2338435 A1 | 6/2011 |
| GB | 622142 A | 4/1949 |
| WO | 2003083351 A1 | 10/2003 |

* cited by examiner

ORIENTABLE MODULE FOR VIDEO/PHOTOGRAPHIC EQUIPMENT

TECHNICAL SCOPE

The present invention relates to an orientable module for optical or video/photographic equipment, having the features mentioned in the preamble of the main claim.

TECHNOLOGICAL BACKGROUND

Video/photographic equipment is usually mounted on suitable supports intended to support such equipment securely and firmly while taking shots.

The supports can, for example, be of the tripod type and are intended to rest on the ground, or other desired supporting surface, to take the shots.

When using the equipment it is necessary to be able to orient said equipment in any way to take the desired shots.

Therefore, an orientation head is usually provided between the equipment and the supports, to which head the video/photographic equipment is coupled and which is in turn mounted on the support to allow the equipment to be oriented so as to take the desired shots.

Such heads are typically provided with one or more articulation joints, for example spherical or cylindrical joints, to vary the position of the equipment supported by the head relative to the support to which it is fixed.

In the case of uneven supporting surfaces, it is necessary to be able to level the supporting surface of the orientation heads of the equipment so as to ensure that the plane of panoramic rotation is parallel to the horizon, i.e. that the pan axis corresponds to the vertical axis.

WO2003/083351 describes a support for photographic equipment, comprising a column intended to be inserted into the hole of a cross-brace and provided at a first longitudinal end thereof with a cup-shaped element intended to slidably accommodate a spherical ball. The cup-shaped element and the spherical ball form a spherical joint allowing the photographic equipment to be oriented.

The cup-shaped element is fixed to the longitudinal end of the column, while the ball is fixed to a coupling plate for coupling a piece of photographic equipment.

The spherical joint is clamped by means of a tie rod that extends within the column along the longitudinal axis thereof and is moveable along said axis in order to lock/release the spherical joint. The tie rod is fixed at a first end thereof to the ball and is provided at its opposite longitudinal end with a threaded shank.

A handle is provided on the column, in the longitudinally opposite position to the spherical joint, which handle can be screwed onto the threaded shank so as to move the tie rod in order to release/lock the spherical joint.

A shortcoming of this locking system is that it makes it awkward for the operator to actuate.

In fact, the locking handle is positioned on the lower part of the support, i.e. in a position that is difficult for an operator to reach.

Another shortcoming of this system is that it is not particularly secure, especially when used with video/photographic equipment and/or heads of appreciable size and weight.

DESCRIPTION OF THE INVENTION

The problem addressed by the present invention is that of producing an orientable module for optical or video/photographic equipment, which is structurally and functionally designed to overcome the limitations set out above with reference to the prior art mentioned.

This problem is solved by the present invention by means of an orientable module produced according to the following claims.

According to the invention, a supporting tripod is also supplied for video/photographic equipment provided with an orientable module fixed to the cross-brace of the support or to a column thereof in order to level the video/photographic equipment to be supported by the tripod.

BRIEF DESCRIPTION OF THE DRAWINGS

The features and advantages of the invention will be more clearly apparent from the detailed description of some preferred embodiments thereof, illustrated by way of non-restrictive example, with reference to the attached drawings, in which.

PREFERRED EMBODIMENT OF THE INVENTION

The figures show an orientable module for optical or video/photographic equipment 1 implemented in accordance with the present invention.

Figure 7:
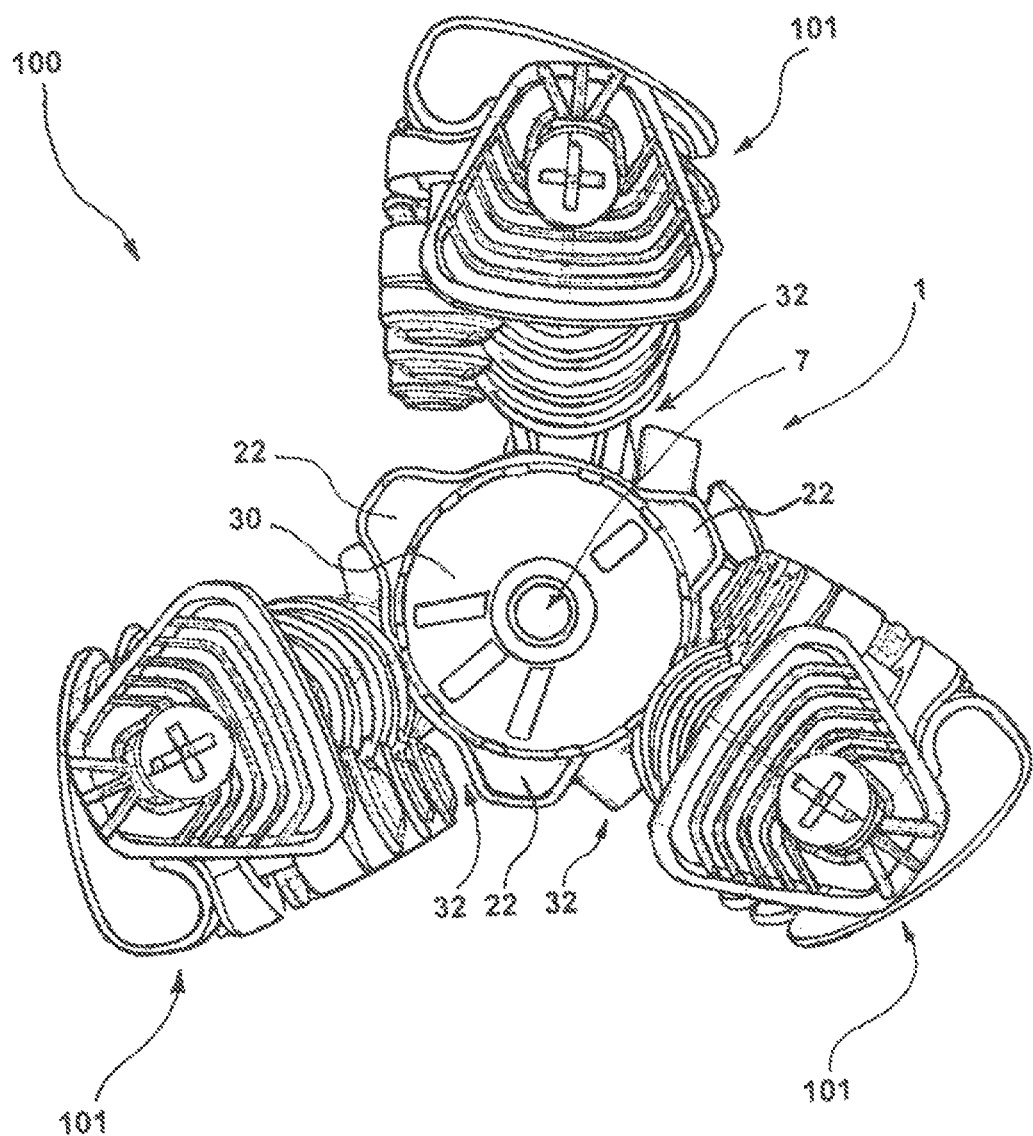
FIG. 7 is a partial view from below of a tripod provided with the orientable module according to the invention in a closed, transport configuration.

The orientable module 1 is intended to be fixed to a support for video/photographic equipment, for example the supporting tripod 100 shown in FIG. 7, and is arranged so as to orient the video/photographic equipment relative to said support.

The support has the function of offering firm contact with the ground, or with a desired supporting surface, and is preferably a tripod.

Figure 1:
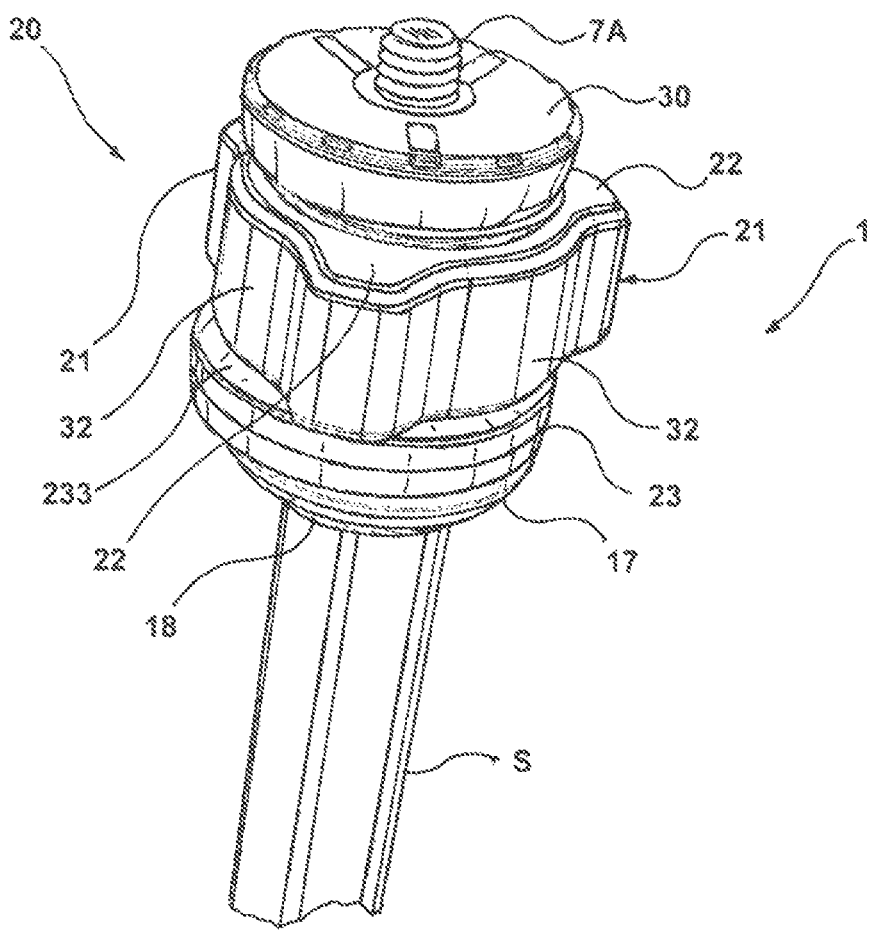
FIG. 1 is a perspective view of an orientable module for optical or video/photographic equipment implemented according to the present invention.
Figure 4:
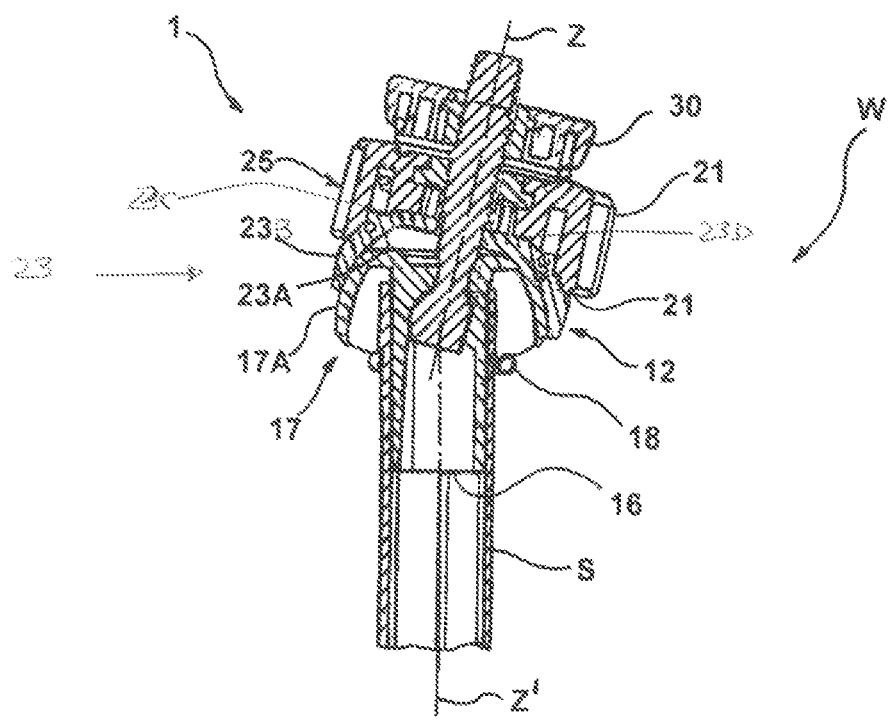
FIG. 4 is a sectional view of the module in FIG. 2, in a second operating configuration.

The supporting tripod 100 may possible comprise a column 5, such as that shown in part in FIGS. 1 and 4, that is hollow inside, extends along its own longitudinal axis Z' and is engaged into a cross-brace of said tripod 100, not visible in the figures, and three support legs 101, which are advantageously telescopic and hinged to the cross-brace. In other versions, the tripod 100 does not comprise the column and the module 1 is inserted into the hole in the cross-brace.

The video/photographic equipment is conventional per se and is therefore not shown in the attached figures.

Advantageously, the video/photographic equipment is coupled to a support head (not shown in the figures), which is orientable so that the video/photographic equipment can be oriented in order to take the desired shots and the head is fixed to the orientable module of the invention, as explained more fully below.

The module 1 comprises an orientable joint 4 provided with a first joint element 2 and a second joint element 3, shown in greater detail in FIG. 2-6, which are connected together so as to be able to oscillate to allow the support head of the video/photographic equipment to be oriented relative to the supporting surface of the support in a desired position selected by the user, as described more fully below.

Figure 5:
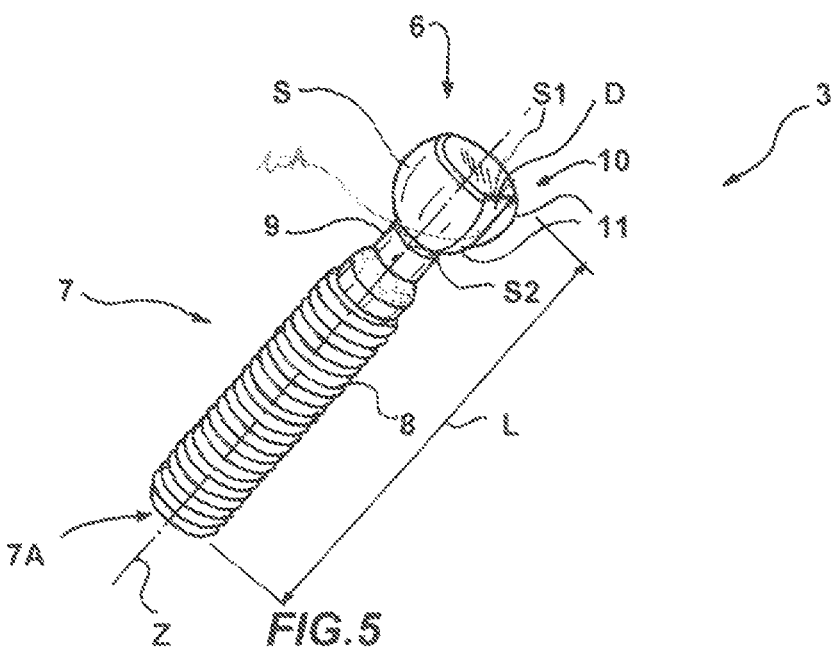
FIG. 5 is an enlarged view of a detail of the module of the invention.
Figure 3:
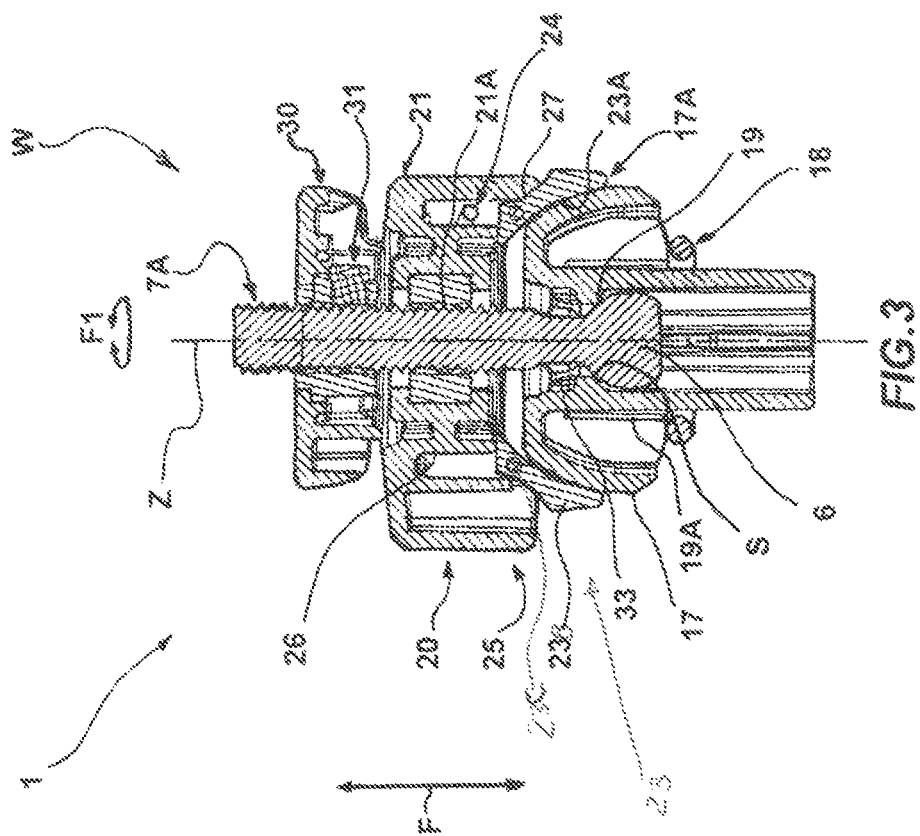
FIG. 3 is a sectional view of the module in FIG. 2, along the plane III-III.
Figure 2:
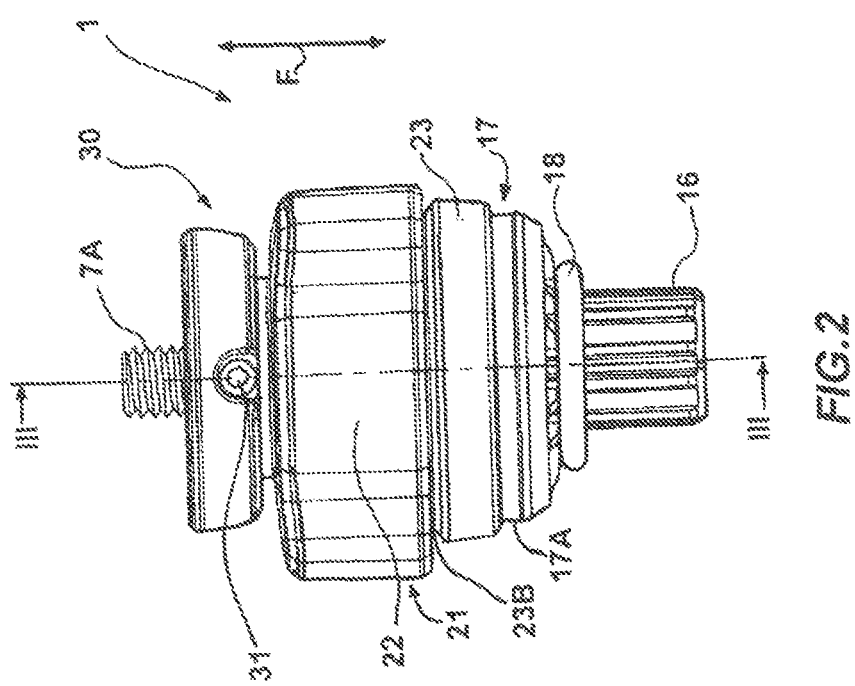
FIG. 2 is a sectional lateral view of the module in FIG. 1.

The second joint element 3, shown in greater detail in FIG. 5, comprises a head 6, which is practically spherical in shape, from which a shaft 7 extends radially.

The shaft 7 has a substantially cylindrical shape and extends along its own longitudinal axis Z corresponding to the longitudinal axis of the second joint element 3. In the version shown, the shaft 7 is provided with a thread 8 over its whole longitudinal extent "L".

In other versions (not shown) of the shaft 7, the thread 8 can be provided on only one or in a few portions of said shaft 7. In other versions (not shown), the shaft can be unthreaded.

The second joint element 3 also comprises a cylindrical connector 9 placed between the shaft 7 and the head 6, having smaller radial dimensions than those of both the head 6 and the shaft 7, and intended to locate the first joint element 2 in the orientation of the video/photographic equipment, as explained more fully below.

The head 6 is shaped substantially as a spherical cap or segment of a sphere, delimited by two opposite bases S1, S2 and connected to the connector 9 by one of the two bases S1, S2.

A groove 10 is defined on the outer surface S of the head 6, which groove extends over the head 6 in the direction of the longitudinal axis Z of the second joint element 3, i.e. between the two opposite bases S1, S2 and is delimited by two opposite longitudinal edges 11 spaced apart by a distance "D" defining the width of the groove 10, i.e. its extent in the direction perpendicular to the longitudinal axis Z.

Figure 6:
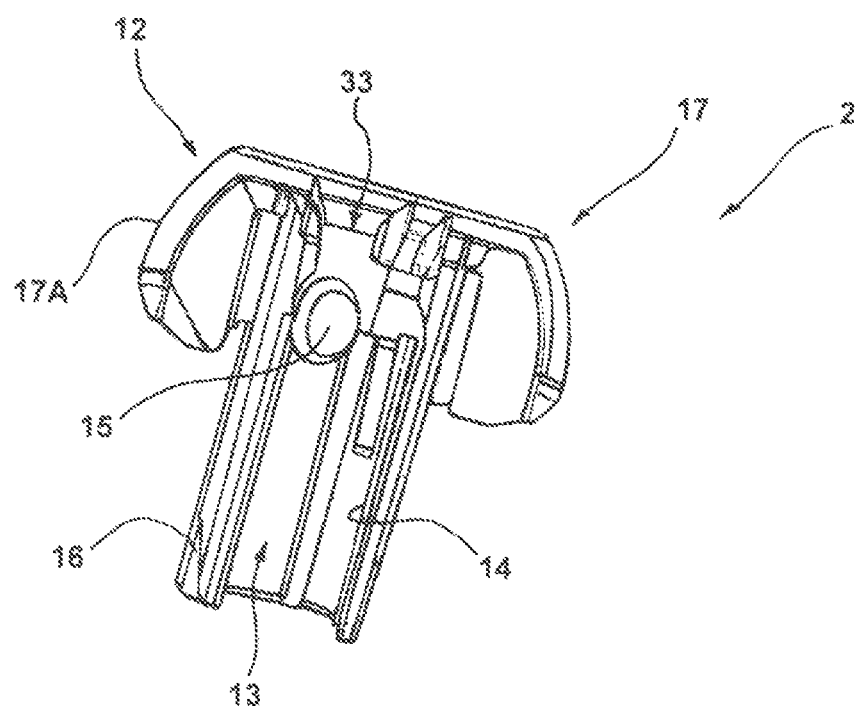
FIG. 6 is an enlarged view of another detail of the module of the invention.

The first joint element 2, shown in greater detail in FIG. 6, comprises a body 12 intended to be fixed either to a support, for example the column 5 of a tripod 100 for video/photographic equipment which column is shown in part in FIGS. 1 and 4, or directly to a cross-brace of a supporting tripod.

The body 12 is hollow on the inside and shaped so as to define a seating cavity 13 accommodating the head 6 of the second joint element 3 and keeping it engaged.

In the version shown, the body 12 comprises a cylindrical sleeve 16 extending along its own longitudinal axis, intended to be inserted into the column 5 and having outer dimensions capable of being inserted tightly, without any possibility of rotation, into said column 5.

When the cylindrical sleeve 16 is inserted into the column 5, the longitudinal axis of the sleeve 16 coincides with the axis of the column 5, and therefore said axes are indicated by the same reference numeral for convenience.

Advantageously, the body 12 and, preferably, the sleeve 16 are fixed in a secure manner, for example by welding or gluing, to the column 5 or, in general, to the supporting tripod.

The sleeve 16 is hollow on the inside, so as to define the seating cavity 13.

Said cavity is delimited by a wall 14 provided with at least one relief element 15 projecting into the seating cavity 13 and intended to be housed inside the groove 10.

The relief element 15 has dimensions practically corresponding to the width D of the groove 10, so as to prevent mutual rotation of the first 2 and second 3 joint element about the longitudinal axis Z.

The opposite longitudinal edges 11 of the groove 10 are raised above the bottom 10A of the groove 10 so as to prevent the relief element 15 from accidentally escaping from said groove 10.

The relief element 15 and the groove 10 act as anti-rotation elements to prevent mutual rotation of the first 2 and second 3 joint element about the longitudinal axis Z.

Conversely, the shape of the relief element 15 and/or of the groove 10 are such as to allow movement of the relief element 15 within the groove 10 in the direction of the longitudinal axis Z, to allow mutual orientation of the first 2 and second 3 joint element, as explained more fully below.

When orienting the second joint element 3 relative to the first joint element 2, the relief element 15 runs inside the groove 10.

When orienting the second joint element 3 relative to the first joint element 2, the relief element 15 and the groove 10 also act as guide elements, as explained more fully below.

On the wall 14 of the seating cavity 13, at least one abutment element 19 is also provided, which extends from the wall 14 into the seating cavity 13 transversely to the longitudinal axis Z' of the cylindrical sleeve 16 and is intended to abut the outer surface S of the head 6 so as to lock the second joint element 3 in said seating cavity 13, as described more fully below.

The at least one abutment element 19 is shaped as a locating tooth projecting outwards into the seating cavity.

The at least one abutment element 19 extends over a circumferential portion of the wall 14 so as to effectively lock the head 6 in the seating cavity 13 and prevent the head 6 from escaping from the seating cavity 13.

In the version shown, the wall 14 is provided with a plurality of abutment elements 19 extending from the wall 14 into the seating cavity 13 and spaced apart from one another around the circumference of the wall 14.

In another version (not shown), the body 12 is provided with a single locating element projecting outwards into the seating cavity 13 of the wall 14 and extending along the entire circumference of the wall 14 and intended to locate the outer surface S of the head 6 so as to lock the second joint element 3 in the seating cavity 13.

Advantageously, the abutment element 19 is provided with an abutting surface 19A intended to abut the outer surface S of the head 6, shaped so as to be shapingly coupled with the outer surface S of the head 6.

The provision of one or more abutment elements 19 projecting outwards into the seating cavity 13 allows the head 6 to be locked securely and firmly in the seating cavity 13.

Moreover, by shaping the abutment surface 19A so that it is shapinlgy coupled with the outer surface S of the head 6, it is possible to improve the locking of the head 6 in the seating cavity 13 and also, at the same time, to facilitate the relative rotation between the first 2 and second 3 joint element.

The one or more abutment elements 19 define the opening 33 of the seating cavity through which the connector 9 of the second joint element 3 passes, the edges of which elements limit, by interference, the extent to which said second joint element 3 can be oriented relative to the first joint element 2.

The provision of a connector 9 between the shaft 7 and the head 6, having smaller radial dimensions than those of both the head 6 and the shaft 7, allows the size of the angle of relative orientation between the first 2 and second 3 joint element to be increased, simultaneously preventing the excessive weakening of the orientable module and maintaining high orientation accuracy.

The seating chamber 13 of the head 6 is, therefore, delimited by the internal side wall 14 of the sleeve 16 and by the abutment surface 19A of the at least one abutment element 19.

The body 12 further comprises a head portion 17 inserted over the cylindrical sleeve 16 and shaped like a skirt positioned outside the cylindrical sleeve 16 having an outer wall 17A with a curved profile.

The body 12 further comprises a damping element positioned on the cylindrical sleeve 16 and intended to abut the supporting tripod 100 so as to dampen and cushion any knocks or blows. In the version shown, the damping element is an O-ring 18 provided on the outside of the cylindrical sleeve 16.

The orientable module 1 further comprises a plate 30 engaged on the shaft 7 of the second support element 3 and intended to support a support and orientation head of a piece of video/photographic equipment. In the version shown, in which the shaft 7 is provided with a thread 8, the plate 30 is screwed onto the shaft 7, while in other versions (not shown), elements other than a thread can be provided for engagement between the plate and the shaft.

The plate 30 is fixed in a certain position on the shaft 7 by means of a grub screw 31, or other suitable fixing elements known in the sector.

Advantageously the length "L" of the shaft 7 is such that an end portion 7A of the shaft 7 longitudinally opposite the head 6 is positioned on the outside of the plate 30 and acts as a coupling portion 7A for coupling the support head of the video/photographic equipment to the orientable module 1.

To that end, the shaft 7, or at least its coupling portion 7A, has dimensions making it compatible with commercially available devices for coupling support heads for video/photographic equipment.

In that case, the support head is directly coupled to the orientable module of the invention, and thereby the module of the invention results in a particularly compact shape.

The orientable module 1 further comprises a locking device 20 engaged on the second joint element 3 and intended to be actuated by a user in order to lock/release the joint 4.

In particular, the locking device 20 is intended to be manoeuvred so as to move the second joint element 3 along a locking axis that corresponds to the longitudinal axis Z of the second joint element 3, between a release configuration of the joint 4 (not shown in the figures), in which the second joint element 3 can oscillate in the seating cavity 13 to allow the equipment to be oriented relative to the support 100, and a locked configuration W of the joint 4 (shown in the figures), in which the second joint element 3 is locked in a desired orientation position relative to the first joint element 2.

In the locked configuration W, the locking device 20 is pressed against the first joint element 2, as explained more fully below, and the first 2 and the second 3 joint elements are positioned and locked in a desired mutual orientation.

Conversely, when the joint 4 is in a release configuration, as stated, the second joint element 3 can be oscillated in the seating cavity 13 so as to orient the video/photographic equipment coupled thereto. For example, the second joint element 3 can be positioned such that the longitudinal axis Z of the second joint element 3 is coaxial with the longitudinal axis Z' of the column 5, as shown in FIG. 1, or tilted relative to the longitudinal axis Z' of the column 5, as shown in FIG. 4. With the joint in both the locked configuration W and the release configuration, the rotation of the second joint element 3 about its own longitudinal axis Z is prevented by the connection between the relief element 15 and the groove 10 which, as stated, act as anti-rotation elements.

The locking device 20 of the orientable module 1 is engaged on the shaft 7 of the second joint element 3 so as to be positioned between the first joint element 2 and the plate 30.

In that way, the locking device 20 is positioned close to the orientation head that rests on the plate 30 and also close to the video/photographic equipment. This makes it possible to increase the convenience and safety of using the orientable module of the invention, as explained more fully below.

The locking device 20 comprises a bush 21 engaged on the shaft 7 and maneuverable in rotation so as to actuate the locking device 20 in order to lock/release the joint 4.

The bush 21 can be maneuvered in rotation so as to cause movement of the locking device 20 relative to the first joint element 2 along the longitudinal axis Z in both directions of the arrow F, so as to clamp/release the second joint element 3 in the seating cavity 13, as explained more fully below.

In the version shown, the inside of the bush 21 is provided with a threaded hole 21A so that it can be screwed onto the thread 8 of the shaft 7. In other versions (not shown), the bush 21 and the shaft 7 can be engaged with one another by means of engagement elements other than the thread, capable of allowing the movement of the bush 21 along the longitudinal axis Z of the shaft 7 so as to lock/release the joint 4.

The bush 21 is provided with gripping elements to make it easier for a user to grip and actuate it.

In the version shown, the bush 21 is provided with three gripping appendages 22, spaced apart over the outer surface of the bush 21 so as to facilitate grasping and actuation by a user in order to rotate the bush 21 within the shaft 7.

The three gripping appendages 22 are advantageously equally spaced apart over the outer surface of the bush 21 and are shaped such that, between two consecutive gripping appendages 22, a recess 32 is defined, into which the user's fingers can be inserted during actuation of the bush, in order to exert greater force when rotating the bush 21.

Furthermore, the recesses 32 can be used for accommodating the legs 101 of a supporting tripod 100 in the closed, transport configuration of said support 100, so as to limit the amount of space occupied by the support 100 in the closed, transport configuration.

Advantageously, the recesses 32 are shaped so as to be shapingly coupled with the legs 101 of the tripod 100 to facilitate their insertion.

Furthermore, the recesses 32 and the gripping appendages 22 are shaped so that, in the closed, transport configuration, the legs of the tripod 100 can be aligned.

The presence of the three gripping appendages 22 and the recesses 32 makes it easier to actuate the bush 21 and also to close a tripod 100 provided with the orientable module 1 according to the invention.

The gripping appendages 22 and the recesses 32 therefore have a self-centering effect when the supporting tripod is closed, and the legs 101 are folded and each inserted into one of the recesses 32, as is more clearly visible in FIG. 7.

Rotating the bush 21, as indicated by the arrow of rotation F1, on the thread 8 of the shaft 7 causes said bush 21 to be moved in a translational manner along the longitudinal axis Z, as indicated by arrow F, so as to lock/release the joint 4 in order to lock the equipment in a desired orientation or to release it and allow it to be oriented relative to the supporting tripod 100, as explained more fully below. Since the presence of the anti-rotation elements prevents relative rotation between the second joint element 3 and the first joint element 2 about the longitudinal axis Z, when the bush 21 is rotated about the longitudinal axis Z, the second joint element 3 is not driven in rotation by the bush 21, therefore said bush is moved along the longitudinal axis Z closer to/further away from the head 6 in order to clamp/release, respectively, the second joint element 3 onto/from the first joint element 2, as explained more fully below.

The locking device 20 further comprises a pusher element 23 inserted between the bush 21 and the first joint element 2 and arranged so as to interact with said first joint element in order to clamp/release the second joint element 3 onto/from the first joint element 2, as explained more fully below.

The pusher element 23 is placed between the bush 21 and the first joint element 2 so as to be positioned abutting against the head portion 17 of the first joint element 2.

The pusher element 23 is coaxial with the bush 21, and is linked thereto so that it can rotate relative to said bush 21 about the longitudinal axis Z, but can be moved together with the bush 21 in a translational manner along the longitudinal axis Z, as explained more fully below.

The pusher element 23 can be moved in a translational manner along the longitudinal axis Z.

The pusher element 23 comprises a cup-shaped body having a base 23C intended to be connected to the bush 21 and a side wall 23B that projects from the base 23C in the direction of the longitudinal axis Z and defines a cavity that increases in breadth as the distance from the base 23C increases.

The side wall 23B is splayed away from the base 23C.

The inner surface 23A of the side wall 23B is intended to be connected to the first joint element 2.

The pusher element 23 comprises a thrust ring, preferably made of aluminium, the inner surface 23A of which defines an annular thrust surface facing towards the first joint element 2 and shaped so as to be connected in positive engagement to the outer wall 17A of the head portion 17 of the first joint element 2.

Advantageously, the thrust surface 23A and the outer surface 17A of the thrust ring 23 and of the head portion 17, respectively, are curved or rounded to make it easier for them to slide over one another.

Furthermore, the use of aluminium to produce the pusher element 23 makes it possible to increase the locking action of the pusher element 23 on the head portion 17.

By rotating the bush 21 about the longitudinal axis Z, away from the release configuration, so as to bring the bush 21 closer to the head 6, the pusher element 23 is driven with a progressively increasing force against the head portion 17 so as to gradually increase the friction torque exerted between the pusher element 23 and the head portion 17 of the first joint element 2 so as to gradually lock the head 6 in the seating cavity 13.

In the locked configuration W, the bush 21 is in a position close to the first joint element 2 and the pusher element 23 is clamped against the head portion 17. Between these two elements there develops a strong friction torque that actually prevents mutual oscillation of the first 2 and the second 3 joint elements.

The bush 21 is connected to the pusher element 23 at the base 23C of said pusher element 23, in other words close to the shaft 7, i.e. on a surface having a limited diameter.

This makes it possible to reduce the friction generated between the bush 21 and the pusher element 23 when the bush 21 is rotated so as to lock/release the joint 4, i.e. the torque required to actuate the locking device 20.

Conversely, the connection between the pusher element 23 and the first joint element 2 is defined at the thrust surface 23A, i.e. the inner surface 23A of the side wall 23B of the pusher element 23, which has a larger diameter than the diameter of the base 23C.

This allows the friction torque generated between the pusher element 23 and the head portion 17 of the first joint element 2 to be maximised so as to optimise fixing of the module of the invention.

The locking device 20 further comprises a friction device 24 for applying friction to the oscillation of the second joint element 3 in the seating cavity 13 relative to the first joint element 2 with the joint 4 in the release configuration.

Advantageously, the friction device 24 is placed between the bush 21 and the first joint element 2 and is configured so as to drive the second joint element 3 to abut the at least one abutment element 19 in order to apply friction to the rotation of the second joint element 3 in the seating cavity.

The friction device is prestressed so as to exert a direct thrust force in order to clamp the second joint element 3 inside the seating cavity 13.

The presence and configuration of the friction device 24 makes it possible to avoid there being sudden movements of the second joint element 3 when the joint 4 is in the release configuration, as explained more fully below.

In the version shown, the friction device 24 is intended to drive the pusher element 23 against the head portion 17 of the first joint element 2 so as to generate a certain amount of friction between the thrust surface 23A and the curved outer wall 17A, so as to provide a certain amount of resistance to mutual oscillation of the first 2 and second 3 joint element.

Friction is thus applied to the movement of the second joint element 3 in the seating cavity 13 and sudden, unwanted movements of the second joint element 3 are avoided, as explained more fully below.

In the version shown, the friction device 24 comprises a spring 25 wound coaxially around the longitudinal axis Z of the shaft 7 and connected at its opposite longitudinal ends 26, 27 to the bush 21 and to the base 23C, respectively, of the pusher element 23.

Advantageously, the bush 21 is provided with a circumferential groove arranged so as to accommodate the first longitudinal end 26 of the spring 25, while the second longitudinal end 27 of the spring 25 is intended to slide over a sliding surface 23D defined on the base 23C of the pusher element 23, longitudinally opposite the thrust surface 23A.

The spring 25 is prestressed so as to drive the pusher element 23 towards the head portion 17 of the body 12 in order to exert a thrust force on the second joint element 3.

The effect of the thrust force exerted by the spring 25 drives the thrust surface 23A so that it abuts the curved outer wall 17A and exerts on said outer wall a thrust that tends to lock the pusher element 23 and the body 12 in the required angular position, i.e. in the desired mutual orientation position.

The thrust exerted by the spring 25 causes friction to be applied to the movement of the head 6 in the seating cavity 13 and therefore in order to move the head 6 within the seating cavity 13, it is necessary to overcome the thrust force exerted by the spring 25, or in general by the friction device 24.

It is thus possible to prevent unwanted movements of the equipment fixed to the orientable module 1 with the joint in the release position.

The force exerted by the spring 25 in the direction of the longitudinal axis Z is applied to the sliding surface 23D of the base 23C of the pusher element 23 and then distributed over the thrust surface 23A thereof that has larger transverse dimensions than the base 23C and, by means of the thrust surface 23A, the force of the spring 25 is transmitted to the outer wall 17A of the head portion 17.

The shape of the sliding surface 23D, the thrust surface 23A and the outer wall 17A allows the torque of forces generated by the spring 25 to be distributed uniformly, and prevents localised stresses on the orientable module.

The locking bush 21 is fixed in translation relative to the longitudinal axis Z, i.e. it has to rotate about the shaft 7 in order to be moved along the longitudinal axis Z; the first joint element 2 is also fixed relative to the longitudinal axis Z.

The friction device 24 is fixed to the bush 21 and placed between said bush and the pusher element 23, and is prestressed so as to drive the pusher element 23, which can be moved along the longitudinal axis Z, towards the first joint element 2 so as to apply friction to the movement of the second joint element in the seating cavity 13.

The thrust force exerted by the friction device 24 in the direction of the longitudinal axis Z is exerted when the joint 4 is in the release configuration, i.e. with the bush 21 in the position remote from the head 6 of the second joint element 3.

By rotating the bush 21 so as to lock the joint 4, i.e. to bring it closer to the head of the second joint element 3, the pusher element 23 is progressively driven against the outer wall 17a of the first joint element 2, gradually increasing the compressive force exerted on the first joint element 2 by the pusher element 23.

Rotating the bush 21 so as to bring it closer to the head of the second joint element 3 gradually increases the resistance, provided by the joint 4, to movement by the preselected configuration until the joint is locked in a particular orientation configuration.

In use, the orientable module 1 is fixed to a support such as a tripod 100, inserting the sleeve 16 for example in a column 5 of the support, the plate 30 is fixed to the orientable module 1, by means of the grub screw 31, in a desired position of the shaft 7.

Next, a piece of video/photographic equipment coupled to an orientable support head is fixed to the orientable module 1, advantageously by screwing onto the coupling portion 7A of the shaft 7 until it rests on the plate 30.

The supporting tripod is thus positioned in a suitable position for taking the desired shots. If the supporting surface of the tripod or the ground is uneven, the orientation head needs to be leveled so that the shots can be taken correctly oriented relative to the horizon, i.e. the orientation of the video/photographic equipment needs to be varied relative to the support.

The equipment usually has to be leveled so that the plane of panoramic rotation thereof is perpendicular to the vertical axis, i.e. parallel to the horizontal plane.

To level the equipment by means of the module of the invention, the user releases the joint 4 of the orientable module 1, maneuvering the locking device 20 so as to place it in the release configuration.

To do this, the user grasps and turns the bush 21 inside the shaft 7 in such a direction as to cause the bush 21 to move away from the head portion 17 of the first joint element 2.

Rotating the bush 21 gradually reduces the thrust exerted by the pusher element 23 on the head portion 17 of the first joint element 2, and consequently the thrust exerted through reaction on the second joint element 3 gradually diminishes. In other words, the first and second joint elements 2, 3 are gradually released from one another.

When the joint 4 is in the release configuration, the pusher element 23 is in contact with the head portion 17 of the first joint element 2 but does not exert any thrust thereon. In the release configuration, however, the spring 25 exerts a force that drives the pusher element 23 onto the head portion 17 of the first joint element 2 so as to keep the head 6 of the second joint element 3 in contact with the abutment surface 19A.

The thrust exerted by the spring 25 requires sufficient force to be exerted to overcome said thrust in order to move the second joint element 3 relative to the first joint element 2, with the joint 4 in the release configuration.

This prevents the video/photographic equipment from falling suddenly.

After having placed the joint 4 in the release configuration, the user can then grasp the equipment and handle it so as to orient it as desired.

After having positioned the equipment in the desired position, and therefore the joint 4 in a desired operational configuration, if necessary with the shaft 7 positioned with the longitudinal axis Z tilted relative to the longitudinal axis Z' of the column 5 (as shown in FIG. 4), the user locks the joint 4 so as to prevent movement from the preselected orientation configuration.

The friction exerted by the spring 25 prevents the joint 4 from being moved from the preselected orientation configuration, for example due to the weight of the equipment.

To do this, the user grasps and rotates the bush 21 about the longitudinal axis Z of the shaft 7 so as to move it towards the head 6.

The pusher element 23 is thus driven against the head portion 17 of the first joint element 2 with a gradually increasing force. The progressive thrust exerted on the head portion 17 of the first joint element 2 by the pusher element 23 allows the second joint element 3 to be progressively locked in a certain position in the seating cavity 13.

Using the orientable module 1 of the invention, a user will find it extremely convenient to actuate the locking device 20 in order to lock/release the joint 4.

The shape of the orientable module of the invention makes it very easy for the joint 4 to be locked/released.

In particular, the user can actuate the bush 21 with the same hand as the one supporting the equipment and/or the one acting on the orientation head. This also increases safety in use.

The provision of the gripping elements makes it easy for a user to grip and actuate said bush.

The invention claimed is:

1. Orientable support module (1) for optical or video/photographic equipment, comprising a first (2) and a second (3) joint element that are connected together so as to be able to oscillate and are configured to be coupled respectively to a support element (5, 100) and to a piece of optical or video/photographic equipment so as to orient said equipment, said second joint element (3) comprising a head (6) and a shaft (7) extending from said head (6) along a longitudinal axis (Z) thereof, said first joint element (2) comprising a body (12) defining a seating cavity (13) for said head (6), said module further comprising a locking device (20) that is actuable so as to displace said second joint element (3) along a locking axis, corresponding to the longitudinal axis (Z) between a release configuration (W') in which said second joint element (3) is free to oscillate in said seating cavity (13), and a locked configuration (W) in which said second joint element (3) is clamped in said seating cavity (13) and is locked in a desired orientation position, said locking device (20) comprising a bush (21) engaged on said shaft (7) and displaceable along said longitudinal axis (Z) so as to clamp/release said second joint element (3) in/from said seating cavity (13), and a friction device (24, 25) for applying friction to the oscillation of said second joint element (3) in said seating cavity (13) in said release configuration, wherein said first joint element (2) and said second joint element (3) comprise respective rotational locking elements (15, 10) for preventing said second joint element (3) from rotating about said longitudinal axis (Z) said locking elements comprise a groove (10) that is defined in said head (6) of said second joint element (3) and extends over said head (6) in a direction of the longitudinal axis (Z) of said second joint element (3), and a relief element (15) provided on said first joint element (2) and projecting into said seating cavity (13) shaped so as to be housed inside said groove (10), said groove (10) is delimited by two opposite longitudinal edges (11) defining a width (D) of said groove (10) for said relief element (15), said relief element (15) having dimensions that generally correspond to said width (D), so that mutual rotation of said first (2) and said second (3) joint element about said longitudinal axis (Z) is substantially prevented wherein said locking device (20) comprises a pusher element (23) inserted between said bush (21) and said first joint element (2) and arranged so as to abut said first joint element (2) in order to drive said first joint element (2) away from said bush (21), said pusher element (23) comprises a cup-shaped body having a base (23C) configured for connection to said bush (21) and a side wall (23B) projecting from said base (23C) and shaped so as to define a cavity that increases in breadth as a distance from said base (23C) increases, said side wall (23B) comprises an inner surface defining an annular thrust surface (23A) that faces towards said first joint element (2) and is shaped so as to be connected in shaped coupled engagement to an outer wall (17A) of said first joint element (2) and said locking device (20) comprises a spring (25) arranged coaxially with said longitudinal axis (Z) and arranged so as to drive said pusher element (23) against said first joint element (2).

2. The support module according to claim 1, wherein said shaft (7) is provided with a thread (8), said bush (21) being rotatable on said thread (8) so as to be displaced relative to said first joint element (2) in order to clamp/release said second joint element (3) in/from said seating cavity (13).

3. The support module according to claim 1, wherein said friction device (24, 25) is placed between said bush (21) and said first joint element (2) and is configured so as to clamp said second joint element (3) in said seating cavity (13).

4. The support module according to claim 1, further comprising a coupling plate (30) that is fixed to said shaft (7) such that said bush (21) is inserted between said plate (30) and said head (6) and is provided to support an orientation head of a piece of video/photographic equipment.

5. The support module according to claim 4, wherein said shaft (7) comprises a coupling portion (7A) that is arranged in a position longitudinally opposite said head (6) and is positioned on the outside of said plate (30) said coupling portion (7A) being intended to allow said piece of video/photographic equipment to be coupled to said orientable support module.

6. The support module according to claim 1, wherein said first joint element (2) comprises at least one abutment element (19) extending into said seating cavity (13) and configured to abut an outer surface (S) of said head (6) so as to lock said second joint element (3) in said seating cavity (13).

7. The support module according to claim 6, wherein said at least one abutment element (19) comprises at least one abutment tooth (19) that projects outwards into said seating cavity (13) in a direction transverse to said longitudinal axis (Z).

8. The support module according to claim 1, wherein said bush comprises at least one gripping element (22) that can be grasped by a user to facilitate the actuation of said bush.

9. The support module according to claim 8, wherein said at least one gripping element comprises three gripping appendages projecting outwards from the bush (21) and shaped such that a seating recess (32) is defined between two consecutive gripping appendages.

\* \* \* \* \*